(12) United States Patent
Charbonnel et al.

(10) Patent No.: US 11,396,836 B1
(45) Date of Patent: Jul. 26, 2022

(54) REDUCTANT DOSING CONTROL SYSTEM

(71) Applicant: Caterpillar Inc., Peoria, IL (US)

(72) Inventors: Sylvain J. Charbonnel, Peoria, IL (US); Kent A. Schonert, Germantown Hills, IL (US); Austin Bierle, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/161,983

(22) Filed: Jan. 29, 2021

(51) Int. Cl.
*F01N 3/20* (2006.01)
*F01N 9/00* (2006.01)
*B01D 53/94* (2006.01)

(52) U.S. Cl.
CPC .............. *F01N 3/208* (2013.01); *F01N 9/005* (2013.01); *B01D 53/9409* (2013.01); *F01N 2560/026* (2013.01); *F01N 2560/06* (2013.01); *F01N 2610/02* (2013.01); *F01N 2900/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,286,419 | B2 * | 10/2012 | Levijoki | F01N 11/002 60/295 |
| 10,196,956 | B2 | 2/2019 | Alfieri et al. | |
| 2008/0092524 | A1 * | 4/2008 | Yokoyama | F01N 11/002 60/277 |
| 2010/0024401 | A1 * | 2/2010 | Ichikawa | F01N 3/2066 60/286 |
| 2010/0028228 | A1 * | 2/2010 | Gady | F01N 3/208 423/213.5 |
| 2015/0345359 | A1 * | 12/2015 | Iwatani | B01D 53/9495 60/286 |
| 2016/0186629 | A1 | 6/2016 | Osburn | |
| 2017/0306818 | A1 * | 10/2017 | Ito | F01N 3/0842 |
| 2019/0010847 | A1 * | 1/2019 | Hagimoto | F01N 3/0814 |
| 2020/0173326 | A1 | 6/2020 | McDaniel | |

FOREIGN PATENT DOCUMENTS

| | | |
|---|---|---|
| DE | 102016011248 A1 | 3/2017 |
| DE | 102018116591 A1 | 1/2019 |

OTHER PUBLICATIONS

Written Opinion and International Search Report for Int'l. Patent Appln. No PCT/US2022/064297, dated May 9, 2022 (12 pgs).

* cited by examiner

*Primary Examiner* — Binh Q Tran
(74) *Attorney, Agent, or Firm* — Bookoff McAndrews PLLC (57) ABSTRACT

Systems and methods for controlling a dosing of reductant for an internal combustion engine system including a catalyst are disclosed. The method includes measuring a value indicative of inlet temperature of the catalyst. When the inlet temperature is less than or equal to a first threshold, the method includes adjusting the dosing of reductant according to a first process. When the inlet temperature is greater than the first threshold, the method includes adjusting the dosing of reductant according to a second process, the second process being different than the first process.

20 Claims, 3 Drawing Sheets

REDUCTANT DOSING CONTROL SYSTEM

TECHNICAL FIELD

The present disclosure relates generally to internal combustion engines, and more particularly, to a reductant dosing control system for one or more exhaust aftertreatment systems for such engines.

BACKGROUND

Internal combustion engines are used in various vehicles, mobile machines, and stationary machines to perform work or generate power by the combustion of a fuel, such as diesel fuel. The combustion of diesel fuel may produce pollutants such as unburned hydrocarbons, carbon monoxide, and nitrogen oxides (NOx). Exhaust systems including aftertreatment devices, such as oxidation or selective catalytic reduction (SCR) catalysts, reduce the amount of potentially harmful emissions that are produced by internal combustion engines. SCR catalysts, for example, catalyze a reaction of a reductant (e.g., urea, ammonia) with NOx that converts NOx to harmless compounds. Aftertreatment systems may include other aftertreatment devices, such as particulate filters, and/or a plurality of catalysts to further assist in the reduction of unwanted emissions.

Such aftertreatment systems may inject the reductant into the flow of exhaust upstream of the catalyst such that the reductant reacts with the NOx in the catalyst to achieve a desired or target conversion of the NOx. At relatively low exhaust temperatures, the reaction may be relatively slow and an amount of reductant may be stored in the catalyst to achieve the desired conversion. Conversely, at relatively high exhaust temperatures, the reaction may be relatively fast such that storage of the reductant is negligible and/or not necessary. Further, the dosing, or amount, of reductant injected into the flow of exhaust is controlled to achieve the desired conversion. However, current control systems may not adequately account for the various reaction speeds at various temperatures. Accordingly, current control systems may not provide an appropriate and/or necessary dosing amount for achieving the desired conversion of NOx at both the relatively low and relatively high temperatures.

U.S. Pat. No. 10,196,956, issued to Alfieri et al. on Feb. 5, 2019 ("the '956 patent"), describes a method of controlling an injector for injecting a reductant into a selective catalytic reduction system of an internal combustion engine. The method of the '956 patent includes measuring a value of NOx concentration and a value of ammonia concentration in the exhaust gas downstream of the selective catalytic reduction system. The measures of NOx concentration and ammonia concentration are compared to predetermined reference values. The method of the '956 patent calculates and controls the quantity of reductant to be injected by the injector based on differences between the measured values and the predetermined reference values. However, the '956 patent may not adequately account for the various reaction speeds of the reductant and the NOx at the various temperatures, and thus the calculated quantity of reductant to be injected may not be appropriate and may include inaccuracies.

The reductant dosing control system of the present disclosure may solve one or more of the problems set forth above and/or other problems in the art. The scope of the current disclosure, however, is defined by the attached claims, and not by the ability to solve any specific problem.

SUMMARY

In one aspect, a method for controlling a dosing of reductant for an internal combustion engine system including a catalyst is disclose. The method may include: measuring a value indicative of inlet temperature of the catalyst; when the inlet temperature is less than or equal to a first threshold, adjusting the dosing of reductant according to a first process; and when the inlet temperature is greater than the first threshold, adjusting the dosing of reductant according to a second process, the second process being different than the first process.

In another aspect, a control system for an internal combustion engine system is disclosed. The system may include: a catalyst configured to receive exhaust from an internal combustion engine; a sensor configured to produce a signal indicative of an inlet temperature of the catalyst; and a controller configured to: measure a value indicative of the inlet temperature of the catalyst; when the inlet temperature is less than or equal to a first threshold, adjust a dosing of reductant according to a first process; and when the inlet temperature is greater than the first threshold, adjust the dosing of reductant according to a second process, the second process being different than the first process.

In yet another aspect, a method for controlling a dosing of reductant for an internal combustion engine system including a catalyst is disclosed. The method may include: measuring a value indicative of nitrogen-oxide (NOx) conversion in an exhaust gas downstream of the catalyst; determining a difference between the measured value indicative of NOx conversion and a target value of NOx conversion; measuring a value indicative of inlet temperature of the catalyst; and when the inlet temperature is less than or equal to a first threshold, adjusting the dosing of reductant according to a first process, wherein the first process includes: adjusting a desired storage of reductant in the catalyst based on the difference between the measured value indicative of NOx conversion and a target value of NOx conversion; and adjusting the dosing of reductant based on the adjusted desired storage; when the inlet temperature is greater than the first threshold, adjusting the dosing of reductant according to a second process, wherein the second process includes: adjusting the dosing of reductant based on the difference between the measured value indicative of NOx conversion and the target value of NOx conversion

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
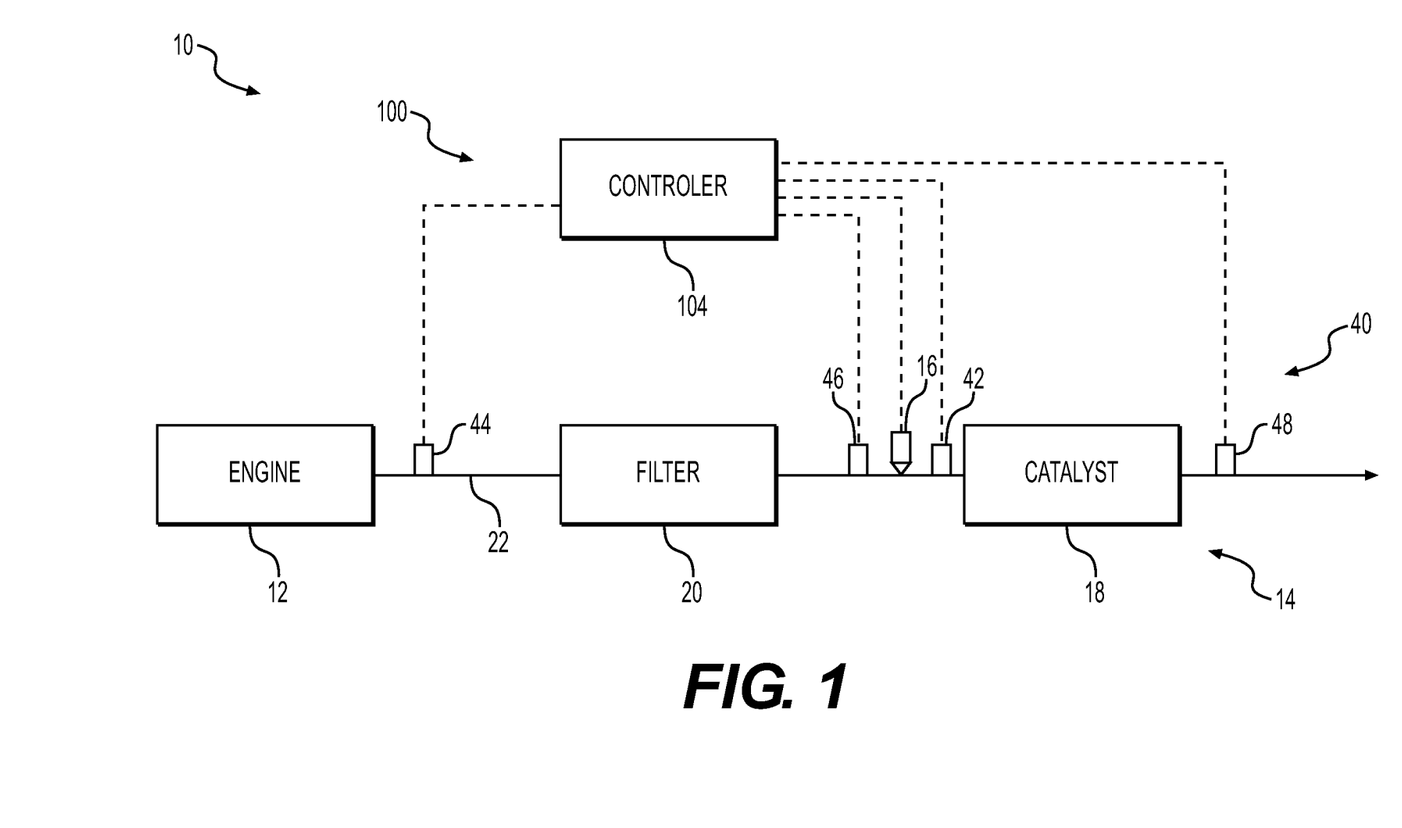
FIG. 1 is a schematic view of an engine system having a reductant dosing control system, according to aspects of the disclosure.

FIG. 1 illustrates a schematic view of an engine system 10 having a reductant dosing control system 100. Engine system 10 includes an engine 12, such as an internal combustion engine. Engine 12 may include, for example, a diesel engine, a gasoline engine, a gaseous fuel-powered engine, a dual fuel engine (e.g., an engine capable of running on both gaseous fuel and/or liquid fuel), or any other type of engine known in the art. Operation of engine 12 may produce power and a flow of exhaust. For example, each combustion chamber (not shown) of engine 12 may mix fuel with air and combust the mixture therein to produce the flow of exhaust. The flow of exhaust may contain carbon monoxide, nitrogen oxide (NOx), carbon dioxide, aldehydes, soot, oxygen, nitrogen, water vapor, hydrocarbons, and/or other type of exhaust gases and/or particulates.

As shown in FIG. 1, engine system 10 also includes an exhaust system 14 and a reductant dosing control system 100. Exhaust system 14 includes one or more components including a reductant injector 16 and a catalyst 18. Exhaust system 14 may also include a filter 20, such as a diesel particulate filter (DPF), for removing particulates and other emissions from the flow of exhaust. Filter 20 may include any type of filter material, such as, for example, ceramics (e.g., cordierite), silicon carbides, ceramic fibers, metal fibers, or the like. Filter 20 may be located downstream of engine 12 and may capture particulates, ash (e.g., soot), or other materials from the exhaust gas to prevent their discharge into the surrounding environment. The one or more components of exhaust system 14 may by fluidly connected via one or more exhaust flow lines 22. Accordingly, the flow of exhaust may be fluidly communicated from engine 12 to exhaust system 14 by flow lines 22. Although not shown, it is understood that exhaust system 14 may include other components such as, for example, one or more turbochargers, and/or any other components known in the art for treating or handling exhaust.

Reductant injector 16 may be located downstream of filter 20. Injector 16 may be connected to a reductant supply (not shown) and may inject reductant into the flow of exhaust in flow lines 22. The reductant may include, for example, urea, urea and water, ammonia, and/or any other elements or compounds capable of chemically reducing compounds (e.g., NOx) contained in the exhaust in the presence of the catalyst 18, as detailed further below. Injector 16 may include a nozzle (not shown), a valve (not shown), and/or other flow control device configured to assist in controllably releasing a flow of reductant from the reductant supply into the flow of exhaust from engine 12. The nozzle and/or valve may be any type of injector known in the art and may include any device capable of injecting and/or atomizing an injected fluid. While the exemplary embodiment depicts injector 16 downstream of filter 20, it is understood that injector 16 may also be located upstream of filter 20.

Catalyst 18 may be located downstream of injector 16 and filter 20. Catalyst 18 may include a selective catalytic reduction (SCR) catalyst. For example, catalyst 18 may include catalyst materials, such as, for example, various ceramic materials (e.g., titanium oxide), oxides of base metals (e.g., vanadium, molybdenum, and/or tungsten), zeolites (e.g., iron zeolite or copper zeolite), various precious metals, and/or any other type of catalyst materials known in the art. Accordingly, catalyst 18 may chemically reduce, or convert, the amount of NOx in the flow of exhaust when the reductant is injected into the flow of exhaust, as detailed further below.

While the exemplary embodiment includes an injector 16, a catalyst 18, and a filter 20, it is understood that exhaust system 14 may also include one or more additional components. For example, exhaust system 14 may include a system for regenerating the filter 20 by removing the particulate matter trapped by the filter 20, other catalytic devices, such as a diesel oxidation catalyst (DOC) and/or an ammonia oxidation (AMOX) catalyst, additional catalytic devices located upstream of filter 20, other exhaust gas treatment devices, and/or any other components known in the art.

Reductant dosing control system 100 includes a controller 104, such as an engine control module (ECM), and a sensor system 40 connected to controller 104. Sensor system 40 may include one or more sensors for measuring temperature, pressure, flow rate, amount of reductant injected (e.g., dosing), and/or other operating characteristics of engine system 10 and/or exhaust system 14. For example, sensor system 40 may include a temperature sensor 42, a mass flow rate sensor 44, an upstream NOx sensor 46, and a downstream NOx sensor 48. Temperature sensor 42 may be located in flow line 22 at, near, and/or adjacent an inlet of catalyst 18 and may sense or measure a temperature of exhaust gas entering catalyst 18. It is understood that temperature sensor 42 may be located anywhere along flow line 22 between engine 12 and catalyst 18, and may include any type of temperature sensor known in the art.

Mass flow rate sensor 44 may be located in flow line 22 and/or may be located at engine 12 and may sense a flow rate of exhaust gas from engine 12. For example, mass flow rate sensor 44 may include a flowmeter that measures the amount of exhaust gas that passes through the flowmeter during a time period to determine the flow rate of the exhaust gas in flow line 22. It is understood that mass flow rate sensor 44 may be located anywhere along flow line 22 and may include any type of flow sensor known in the art.

Upstream NOx sensor 46 may be located in flow line 22 downstream of engine 12 and upstream of catalyst 18. While the exemplary embodiment depicts upstream NOx sensor 46 located upstream of injector 16, it is understood that upstream NOx sensor 46 may be located anywhere between engine 12 and catalyst 18. Downstream NOx sensor 48 may be located in flow line 22 downstream of catalyst 18, such as at, near, and/or adjacent an outlet of catalyst 18 and/or at, near, and/or adjacent a tail pipe (not shown) of exhaust system 14. It is understood that downstream NOx sensor 48 may be located anywhere in flow line 22 downstream of catalyst 18. Upstream and downstream NOx sensors 46, 48 may include sensors that are configured to generate a measured value that is indicative of NOx concentration at the location of the respective NOx sensor 46, 48. NOx sensors 46, 48 may also be cross sensitive to ammonia such that each NOx sensor 46, 48 is also configured to generate a measured value that is indicative of ammonia concentration at the location of the respective NOx sensor 46, 48. It is understood that NOx sensors 46, 48 may include any type of sensor for measuring NOx concentration as known in the art. Further, sensor system 40 may include any number and/or combination of sensors as necessary.

Controller 104 may also be in communication with injector 16 for regulating and controlling reductant injection into flow line 22. For example, controller 104 may control a valve of injector 16 for controlling a dosing of reductant into flow line 22, as detailed further below. As used herein "dosing" of reductant includes an amount and/or flow rate of reductant from injector 16. Controller 104 may also be in communication with components of engine 12 for controlling aspects of engine 12.

Figure 2:
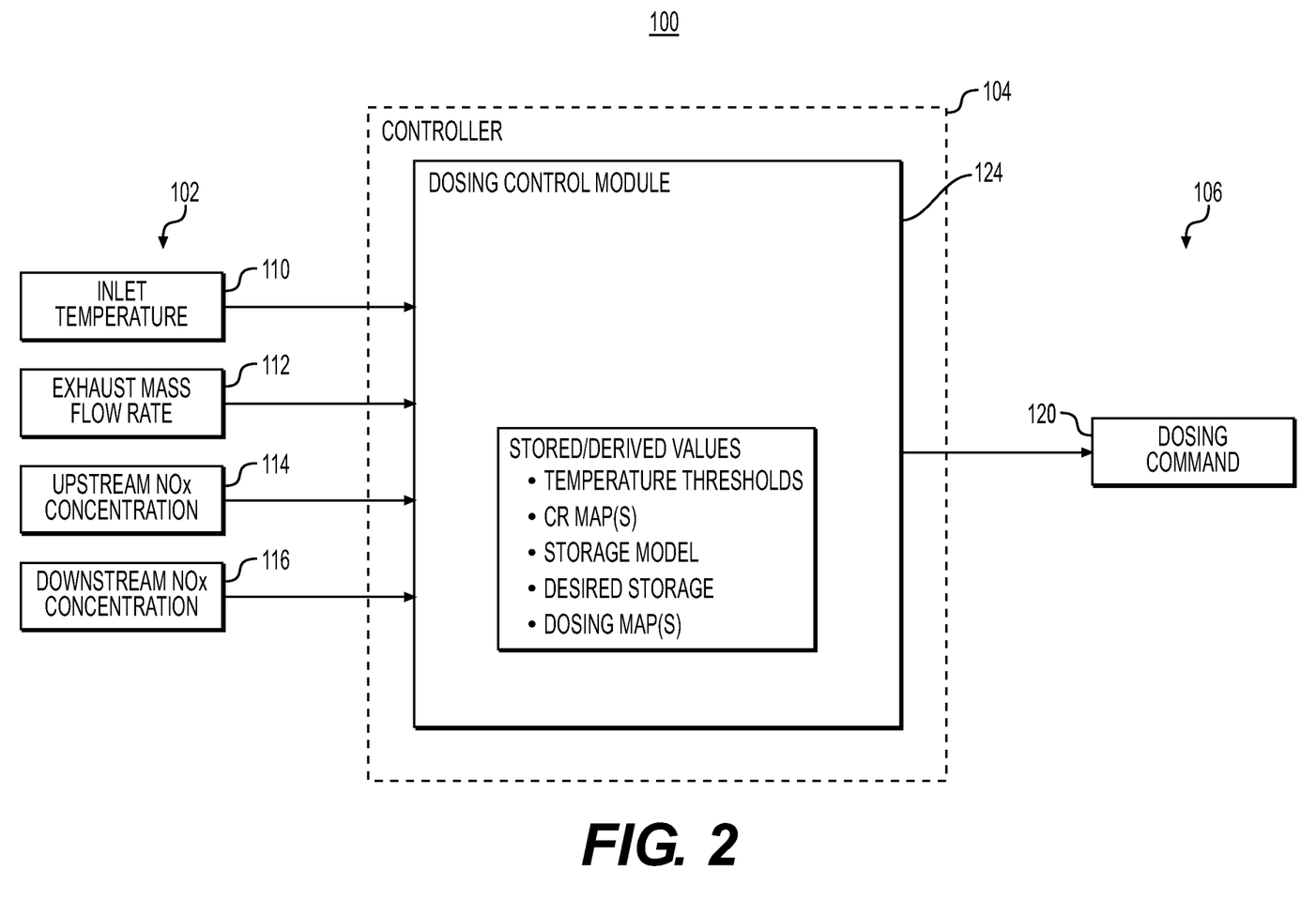
FIG. 2 is a schematic view of the exemplary reductant dosing control system for the engine system of FIG. 1.

FIG. 2 illustrates a schematic view of the exemplary reductant dosing control system 100 for operation and/or control of at least portions of engine system 10. System 100 may include inputs 102, controller 104, and outputs 106. Inputs 102 may include, for example, inlet temperature signal 110 from temperature sensor 42, exhaust mass flow rate signal 112 from flow rate sensor 44, upstream NOx concentration signal 114 from upstream NOx sensor 46, and downstream NOx concentration signal 116 from downstream NOx sensor 48. Inlet temperature signal 110 may be determined or derived by controller 104 based on the measured value from the temperature sensor 42. Accordingly the inlet temperature signal 110 may provide a current temperature at the inlet of catalyst 18.

Controller 104 may determine or otherwise derive a current mass flow rate of exhaust from engine 12 based on the received mass flow rate signal 112. In some embodiments, mass flow rate sensor 44 may not be needed, or may be used in addition to deriving exhaust mass flow rate signal 112. Accordingly, controller 104 may derive exhaust mass flow rate signal 112 based on one or more engine operating conditions, such as engine speed, mass flow rate of air entering the engine 12, and/or a fueling ratio of the engine 12. For example, a value indicative of exhaust mass flow rate may be proportional to engine speed and/or may derived from the mass flow rate of air entering the engine 12 and the fueling ratio of engine 12.

Controller 104 may determine or otherwise derive an upstream NOx concentration and a downstream NOx concentration in the exhaust based on the upstream and downstream NOx concentration signals 114, 116, respectively, in addition to other parameters, such as the inlet temperature signal 110 and the exhaust mass flow rate signal 112.

Outputs 106 may include, for example, a dosing command signal 120. Controller 104 also includes a dosing control module 124. Dosing control module 124 may receive inputs 102, implement a method 300 for controlling the dosing of reductant and control outputs 106, as described with reference to FIG. 3 below.

Controller 104 may embody a single microprocessor or multiple microprocessors that may include means for controlling a dosing of reductant for engine system 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of method 300 of FIG. 3. Further, the memory or secondary storage device associated with controller 104 may also store data received from the various inputs 102 associated with reductant dosing control system 100. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry.

Controller 104 may also include stored and/or derived values for use by dosing control module 124. For example, the stored and/or derived values may include one or more temperature thresholds, one or more conversion ratio (CR) maps, one or more storage models, a desired storage, and one or more dosing maps. Controller 104 may use the one or more temperature thresholds to trigger one or more control methods for controlling the dosing of reductant based on the inlet temperature signal 110, as detailed further below with respect to FIG. 3. For example, the temperature thresholds may include a first temperature threshold for triggering a first control of the dosing, and a second temperature threshold for triggering a second control of the dosing. In some embodiments, the second threshold may be equal to or substantially similar to the first threshold. The CR maps may include one or more maps or lookup tables for providing a target NOx conversion as a function of temperature and mass flow rate of the exhaust gas. For example, controller 104 may receive temperature signal 110 and exhaust mass flow rate signal 112, and determine the corresponding target NOx conversion based on the temperature and mass flow rate. The target NOx conversion may be a value of conversion of NOx in the catalyst 18, as detailed further below.

The storage model may provide an actual, estimated, or predicted storage of reductant in catalyst 18. The storage model may be a model of the actual, estimated, or predicted storage of reductant in catalyst 18 based on one or more current operating conditions, such as, for example, the exhaust temperature, exhaust mass flow rate, $O_2$ in the exhaust, and/or the current reductant dosing derived from current operating conditions and dosing maps, detailed below. The model may include a physics-based model that is based on one or more physical and/or chemical equations to estimate or predict the storage of reductant in the catalyst 18. The model may be built and calibrated during testing of engine system 10.

The desired, or target, storage may be a desired or target value or amount of reductant to be stored in catalyst 18. The desired storage may correspond to a desired amount of reductant that is absorbed by the catalyst 18 for achieving the target NOx conversion. For example, the desired storage may include one or more maps or lookup tables of desired storage as a function of inlet temperature and exhaust mass flow rate. The desired storage may be dependent, or otherwise may be adjusted based, on a difference between an actual or measured NOx conversion and the target NOx conversion, as detailed further below.

The dosing maps may include one or more maps or lookup tables for providing a dosing (e.g., amount and/or flow rate) of reductant from injector 16. The dosing maps may include a normalized parameter that indicates how much reductant to be injected. For example, the dosing maps may include a reductant (e.g., ammonia) to NOx ratio as a function of inlet temperature and mass flow rate of the exhaust. For example, the inlet temperature and mass flow rate may be inputs for the maps, and the maps may output a reductant to NOx ratio. The controller 104 may then control the injector 16 to achieve the output reductant to NOx ratio. Thus, the dosing maps may provide a dosing based on inlet temperature and mass flow of the exhaust. The dosing may be adjusted based on the desired storage and/or based on the difference between the measured NOx conversion and the target NOx conversion, as detailed further below with respect to FIG. 3. Thus, controller 104 may determine or otherwise derive the current dosing based on the dosing maps and/or the adjusted dosing.

Dosing command signal 120 output may include control of aspects of engine system 10. Controller 104 may derive dosing command signal 120 based on the dosing maps, as detailed below. Dosing command signal 120 may be sent to injector 16 to control the position of the valve and/or nozzle of injector 16 to control the dosing of reductant into flow line 22. Accordingly, a value indicative of the dosing of reductant may be proportional, or otherwise may correspond, to the position of the valve and/or nozzle of injector 16.

INDUSTRIAL APPLICABILITY

The disclosed aspects of the reductant dosing control system 100 of the present disclosure may be used in any engine system 10 having an exhaust system 14 that utilizes a catalyst 18.

Referring to FIG. 1, during the operation of engine system 10, exhaust may flow from engine 12 into exhaust system 14 via flow lines 22. The exhaust may flow through filter 20 such that filter 20 removes particulates and other emissions from the flow of exhaust. Injector 16 may inject reductant into the flow of exhaust at a desired dosing, as detailed below. Reductant injected into the flow of exhaust by injector 16 may be absorbed on the catalyst 18 so that the reductant may react with NOx in the flow of exhaust to form $H_2O$ (e.g., water vapor) and Na (e.g., nitrogen gas). For example, a mixture of urea and water injected by the injector 16 may decompose to ammonia, and the catalyst 18 may facilitate a reaction between the ammonia and NOx in the flow of exhaust to produce water and nitrogen gas, thereby removing NOx from the flow of exhaust. After exiting catalyst 18, the flow of exhaust may be output from the exhaust system 14, and released into the atmosphere (e.g., through a tail pipe). Further, controller 104 may control the dosing of reductant into the flow of exhaust based on one or more variables. For example, at relatively low exhaust temperatures (e.g., less than 450° C.), the reaction of the reductant and NOx in the catalyst 18 may be relatively slow. Accordingly, the reductant may be stored (e.g., absorbed) in the catalyst 18 as needed to achieve a target NOx conversion. Thus, the controller 104 may use a closed control loop to adjust the dosing of reductant based on, for example, a desired storage of reductant (e.g., ammonia) in the catalyst 18, as detailed further below.

However, at relatively high exhaust temperatures (e.g., greater than 500° C.), the reaction of reductant and NOx in the catalyst 18 may be relatively fast and/or substantially instantaneous. For example, the reaction of reductant and NOx in the catalyst 18 may occur substantially immediately, such that storage of reductant in the catalyst 18 is not necessary and/or may be negligibly low. Further, in embodiments where the injector 16 is located upstream of the filter 20, upstream catalysts may migrate into the filter due to relatively high temperatures. The reductant may then oxidize in the filter, and thus there may be less reductant at the catalyst 18 to react with the NOx in the exhaust, leading to a degradation in overall performance of the exhaust system 14. Accordingly, the closed control loop dependent on a desired storage, as described above, may provide inaccurate dosing and the control loop may not be properly closed when the exhaust temperature is relatively high.

Figure 3:
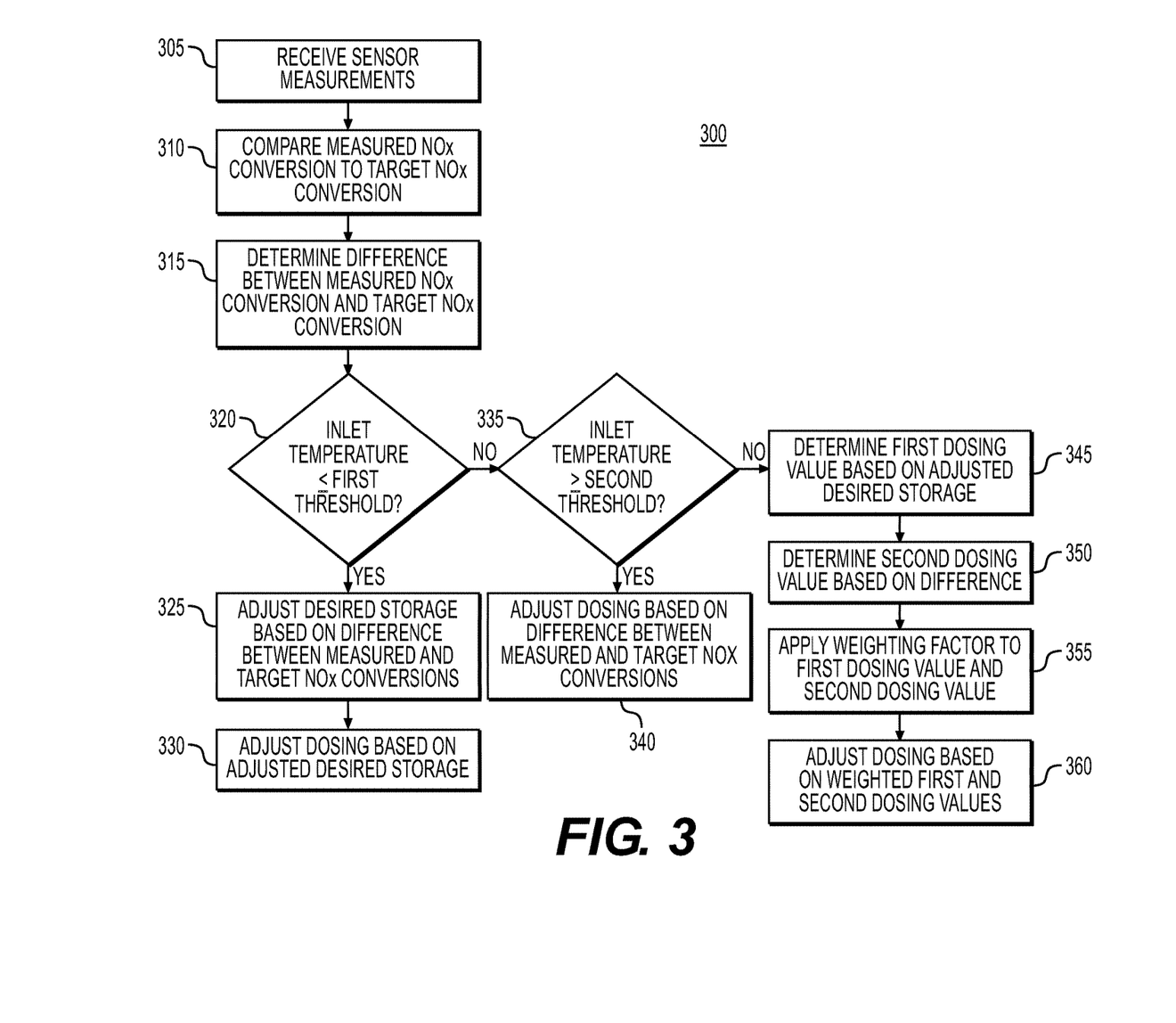
FIG. 3 provides a flowchart depicting an exemplary method for controlling a dosing of reductant for an internal combustion engine system including a catalyst for the system of FIG. 1.

FIG. 3 illustrates a flowchart depicting an exemplary method 300 for controlling a dosing of reductant for engine system 10 including a catalyst 18. In step 305, module 124 may receive sensor measurements from sensors 42-48. For example, module 124 may receive inlet temperature signal 110, exhaust mass flow rate signal 112, and upstream NOx concentration signal 114, downstream NOx concentration signal 116.

In step 310, module 124 may compare a measured NOx conversion to a target NOx conversion. For example, module 124 may determine the measured NOx conversion based on the measured values of the upstream NOx concentration and the downstream NOx concentration. The measured NOx conversion is a difference between the measured values of the upstream NOx concentration and the downstream NOx concentration. Accordingly, the measured NOx conversion is a value indicative of the amount of NOx that has actually been converted. The target NOx conversion is a value indicative of the amount of NOx that is intended to be converted. For example, the target NOx conversion may correspond to a desired amount of NOx safely leaving engine system 10. Module 124 can determine the target NOx conversion based on the conversion ratio maps, as detailed above. Further, as used herein, NOx conversion may also refer to total NOx concentration downstream of catalyst 18 (e.g., as measured by downstream NOx sensor 48), a NOx concentration in a tailpipe (not shown) of exhaust system 14 (e.g., as measured by another NOx sensor), or any other value and/or measurement indicative of NOx in the exhaust gas downstream of catalyst 18.

In step 315, module 124 may determine a difference between the measured NOx conversion and the target NOx conversion. The difference may indicate an error between the measured NOx conversion and the target NOx conversion. For example, the difference may indicate the measured NOx conversion is higher than the target NOx conversion (e.g., there is too much NOx conversion), and/or may indicate the measured NOx conversion is lower than the target NOx conversion (e.g., there is not enough NOx conversion). Module 124 may use the error to adjust the dosing of reductant from injector 16, as detailed below, such that the measured NOx conversion ratio is equal to or substantially similar to the target NOx conversion ratio.

In step 320, module 124 may determine whether the inlet temperature is less than or equal to a first threshold. For example, module 124 may compare the measured inlet temperature, as determined from inlet temperature signal 110, to the first threshold. The first threshold may be a predetermined inlet temperature value for triggering a first control of the dosing of reductant, as detailed above. For example, the first threshold may be 450° C., such that that first control is triggered at relatively low exhaust temperatures.

As detailed above, module 124 may perform a closed control loop for controlling and adjusting the dosing of reductant based on storage of reductant in the catalyst 18 at relatively low exhaust temperatures. Accordingly, in step 325, when the inlet temperature is less than or equal to the first threshold (step 320: YES), module 124 may adjust a desired storage of reductant in catalyst 18 based on the difference between the measured NOx conversion and the target NOx conversion. For example, if the measured NOx conversion is lower than the target NOx conversion, the desired storage may be increased. Similarly, if the measured NOx conversion is higher than the target NOx conversion, the desired storage may be decreased.

In step 330, module 124 may adjust the dosing of reductant based on the adjusted desired storage. For example, module 124 may adjust the dosing such that the actual, estimated, or predicted storage of reductant in catalyst 18 is equal to or substantially similar to the adjusted desired storage. To do so, module 124 may determine the actual, estimated, or predicted storage based on the storage model, as detailed above, and compare the actual, estimated, or predicted storage of reductant to the adjusted desired storage. If the actual, estimated, or predicted storage is not equal to or substantially similar to the adjusted desired storage, module 124 may adjust the dosing of reductant from injector 16. For example, module 124 may adjust the dosing such that the dosing makes the actual, estimated, or predicted storage equal to or substantially similar to the adjusted desired storage.

Accordingly, module 124 may adjust the dosing based on the difference between the actual, estimated, or predicted storage and the adjusted desired storage. For example, if the actual, estimated, or predicted storage is lower than the adjusted desired storage, the dosing may be increased. Similarly, if the actual, estimated, or predicted storage is higher than the adjusted desired storage, the dosing may be decreased. Thus, the first control of dosing is a closed control loop in that the difference (e.g., error) between the measured NOx conversion and the target NOx conversion provides a feedback signal that is used to adjust the desired storage. The difference (e.g., error) between the actual, estimated, or predicted storage and the adjusted desired storage provides another feedback signal that is then used to adjust the dosing. For example, the feedback signal of the difference in storage can be used to generate a feedback dosing that is added to and/or subtracted from the current dosing (e.g., as determined from the current operating conditions and the dosing maps). As such, module 124 may adjust the dosing based on the adjusted desired storage to generate dosing command signal 120 output and send the dosing command signal 120 to injector 16 to adjust the dosing.

In step 335, if the inlet temperature is greater than the first threshold (step 320: NO), module 124 may determine whether the inlet temperature is greater than or equal to a second threshold. For example, module 124 may compare the measured inlet temperature, as determined from inlet temperature signal 110, to the second threshold. The second threshold may be a predetermined inlet temperature value for triggering a second control of the dosing of reductant, as detailed above. For example, the second threshold may be 500° C., such that the second control is triggered at relatively high exhaust temperatures. While the exemplary embodiment depicts the first and second thresholds being different, it is understood that the first and second thresholds may be equal or substantially similar. Further, the first and second thresholds may include any value of temperature as necessary.

As detailed above, the closed control loop based on storage may not be appropriate and/or may not be totally closed at relatively high temperatures due to the reaction of reductant and NOx in the exhaust occurring relatively fast at relatively high temperatures. For example, the desired storage at high temperatures may be relatively low and/or substantially negligible regardless of the difference in the measured NOx conversion and the target NOx conversion. Therefore, the feedback of the error in NOx conversion into the desired storage at high temperatures may create or cause inaccuracies in the control loop such that the adjusted dosing may be inaccurate, inappropriate, or insufficient for achieving the target NOx conversion. Accordingly, in step 340, when the inlet temperature is greater than the second threshold (step 335: YES), module 124 may adjust the dosing of reductant based on the difference (e.g., error) between the measured NOx conversion and the target NOx conversion. For example, if the measured NOx conversion is lower than the target NOx conversion, module 124 may increase the dosing. Similarly, if the measured NOx conversion is higher than the target NOx conversion, module 124 may decrease the dosing. Thus, module 124 may adjust the dosing such that the measured NOx conversion is equal to or substantially similar to the target NOx conversion.

Accordingly, the second control of dosing is a closed loop in that that the difference (e.g., error) between the measured NOx conversion and the target NOx conversion provides a feedback signal that is used to adjust the dosing directly. For example, the feedback signal may be added, subtracted, multiplied, and/or divided to the current dosing (e.g., as determined from the current operating conditions and the dosing maps) to adjust the dosing. As such, module 124 may adjust the dosing based on the difference between measured and target NOx conversions to generate a dosing command signal 120 output and send the dosing command signal 120 to injector 16 to adjust the dosing. Therefore, the second control of dosing accounts for the negligible storage at high temperatures and closes the loop by not including the feedback into the desired storage.

When the first and second thresholds of temperature are different and the inlet temperature is between the first and second thresholds, module 124 may weight the adjusted dosing from the first and second controls of dosing to adjust the dosing accordingly. As such, in step 345, when the inlet temperature is less than the second threshold (step 335: NO), module 124 may determine a first dosing value based on the adjusted desired storage. For example, module 124 may determine the first dosing value by the first control of dosing, as detailed above. In step 350, module 124 may determine a second dosing value based on the difference between the measured and target NOx conversions. For example, module 124 may determine the second dosing value by the second control of dosing, as detailed above. In step 355, module 124 may apply a weighting factor to the first dosing value and the second dosing value. The weighting factor may be a value between zero and one and may correspond to a proportional amount the inlet temperature is from the first threshold and the second threshold. For example, the first dosing value may be weighted more or higher if the inlet temperature is closer to the first threshold than the second threshold. Likewise, the second dosing value may be weighted more or higher if the inlet temperature is closer to the second threshold. In step 360, module 124 may adjust the dosing based on the weighted first and second dosing values. For example, the adjusted dosing may be a weighted average of the first dosing value and the second dosing value based on how close the inlet temperature is to the first threshold and/or the second threshold. If the inlet temperature is directly between the first threshold and second threshold (e.g., the inlet temperature is an average of the first threshold and the second threshold), the adjusted dosing may be an average of the first dosing value and the second dosing value.

Reductant dosing control system 100 may provide a robust closed loop control system for adjusting dosing of reductant in an exhaust system 14. For example, reductant dosing control system 100 may include a first control of dosing at relatively low temperatures, and a second control of dosing at relatively high temperatures. Such a control system 100 may close the control loop at high temperatures when storage of reductant in the catalyst 18 is substantially negligible. Accordingly, the control system 100 of the present disclosure may provide a more accurate and/or appropriate adjustment of dosing to achieve target NOx conversions at high temperatures. Further, such a reductant dosing control system 100 may reduce or eliminate performance degradation due to the reductant reacting with catalyst material that may have migrated from an upstream catalyst component into the filter 20 when injector 16 is located upstream of filter 20. For example, the module 124 may adjust the dosing accordingly to compensate for the reduced reductant in the flow of exhaust. Therefore, reductant dosing control system 100 can account for the various reaction speeds of reductant and NOx at various temperatures to more effectively and accurately adjust the dosing to achieve target NOx conversions.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for controlling a dosing of reductant for an internal combustion engine system including a catalyst, the method comprising:
   measuring a value indicative of inlet temperature of the catalyst;
   determining whether the inlet temperature is less than or equal to a first temperature threshold;
   upon determining that the inlet temperature is less than or equal to the first temperature threshold, adjusting the dosing of reductant according to a first process, wherein the first process includes:
     adjusting a desired storage of reductant in the catalyst, wherein the desired storage is a target amount of reductant that is absorbed by the catalyst; and
     adjusting the dosing of reductant based on the adjusted desired storage; or
   upon determining that the inlet temperature is greater than the first temperature threshold, adjusting the dosing of reductant according to a second process, wherein the second process includes:
     adjusting the dosing of reductant based on a difference between a measured value indicative of nitrogen oxide (NOx) conversion downstream of the catalyst and a target value of NOx conversion.

2. The method of claim 1, wherein the first process includes:
   adjusting the desired storage of reductant in the catalyst based on a difference between a measured value indicative of nitrogen oxide (NOx) conversion downstream of the catalyst and a target value of NOx conversion.

3. The method of claim 2, wherein the adjusting the desired storage of reductant based on the difference according to the first process includes:
   increasing the desired storage when the measured value indicative of NOx conversion is less than the target value of NOx conversion; or
   decreasing the desired storage when the measured value indicative of NOx conversion is greater than the target value of NOx conversion.

4. The method of claim 3, wherein adjusting the dosing of reductant based on the adjusted desired storage according to the first process includes:
   determining a difference between an actual, estimated, or predicted storage of reductant in the catalyst and the adjusted desired storage; and
   adjusting the dosing based on the difference between the actual, estimated, or predicted storage and the adjusted desired storage.

5. The method of claim 1, wherein the adjusting the dosing based on the difference according to the second process includes:
   increasing the dosing when the measured NOx conversion is less than the target NOx conversion; or
   decreasing the dosing when the measured NOx conversion is greater than the target NOx conversion.

6. The method of claim 1, further including a second temperature threshold, wherein the second temperature threshold is different than the first temperature threshold, and the method further includes:
   determining whether the inlet temperature is greater than or equal to the second temperature threshold; and
   upon determining that the inlet temperature is greater than or equal to the second temperature threshold, adjusting the dosing of reductant according to the second process.

7. The method of claim 6, further including:
   determining whether the inlet temperature is between the first temperature threshold and the second temperature threshold; and
   upon determining that the inlet temperature is between the first temperature threshold and the second temperature threshold, adjusting the dosing of reductant according to a third process, the third process being different than the first process and the second process.

8. The method of claim 7, wherein the third process includes:
   determining a first dosing value based on the first process;
   determining a second dosing value based on the second process;
   weighting the first and second dosing values based on the inlet temperature; and
   adjusting the dosing based on the weighted first and second dosing values.

9. The method of claim 8, wherein the first dosing value is weighted more when the inlet temperature is closer to the first temperature threshold, and wherein the second dosing value is weighted more when the inlet temperature is closer to the second temperature threshold.

10. A control system for an internal combustion engine system, comprising:
   a catalyst configured to receive exhaust from an internal combustion engine;
   a sensor configured to produce a signal indicative of an inlet temperature of the catalyst; and
   a controller configured to:
   measure a value indicative of the inlet temperature of the catalyst;
   determine whether the inlet temperature is less than or equal to a first temperature threshold;
   upon determining that the inlet temperature is less than or equal to the first temperature threshold, adjust a dosing of reductant according to a first process, wherein the first process includes:
     adjusting a desired storage of reductant in the catalyst, wherein the desired storage is a target amount of reductant that is absorbed by the catalyst; and
     adjusting the dosing of reductant based on the adjusted desired storage; and
   upon determining that the inlet temperature is greater than the first temperature threshold, adjust the dosing of reductant according to a second process, wherein the second process includes:

adjusting the dosing of reductant based on a difference between a measured value indicative of nitrogen oxide (NOx) conversion downstream of the catalyst and a target value of NOx conversion.

11. The control system of claim 10, wherein the first process includes the controller configured to:
adjust the desired storage of reductant in the catalyst based on a difference between a measured value indicative of nitrogen oxide (NOx) conversion downstream of the catalyst and a target value of NOx conversion.

12. The control system of claim 11, wherein the adjusting the desired storage of reductant based on the difference according to the first process includes the controller configured to:
increase the desired storage when the measured value indicative of NOx conversion is less than the target value of NOx conversion; and
decrease the desired storage when the measured value indicative of NOx conversion is greater than the target value of NOx conversion.

13. The control system of claim 12, wherein adjusting the dosing of reductant based on the adjusted desired storage according to the first process includes the controller configured to:
determine a difference between an actual, estimated, or predicted storage of reductant in the catalyst and the adjusted desired storage; and
adjust the dosing based on the difference between the actual, estimated, or predicted storage and the adjusted desired storage.

14. The control system of claim 10, wherein the adjusting the dosing based on the difference according to the second process includes the controller configured to:
increase the dosing when the measured NOx conversion is less than the target NOx conversion; and
decrease the dosing when the measured NOx conversion is greater than the target NOx conversion.

15. The control system of claim 10, further including a second temperature threshold, wherein the second temperature threshold is different than the first temperature threshold, and the controller is further configured to:
determine whether the inlet temperature is greater than or equal to the second temperature threshold; and
upon determining that the inlet temperature is greater than or equal to the second temperature threshold, adjust the dosing of reductant according to the second process.

16. The control system of claim 15, wherein the controller is further configured to:
determine whether the inlet temperature is between the first temperature threshold and the second temperature threshold; and
upon determining that the inlet temperature is between the first temperature threshold and the second temperature threshold, adjust the dosing of reductant according to a third process, the third process being different than the first process and the second process.

17. The control system of claim 16, wherein the third process includes the controller configured to:
determine a first dosing value based on the first process;
determine a second dosing value based on the second process;
weight the first and second dosing values based on the inlet temperature; and
adjust the dosing based on the weighted first and second dosing values.

18. A method for controlling a dosing of reductant for an internal combustion engine system including a catalyst, the method comprising:
measuring a value indicative of nitrogen-oxide (NOx) conversion in an exhaust gas downstream of the catalyst;
determining a difference between the measured value indicative of NOx conversion and a target value of NOx conversion;
measuring a value indicative of inlet temperature of the catalyst; and
determining whether the inlet temperature is less than or equal to a first temperature threshold;
upon determining that the inlet temperature is less than or equal to the first temperature threshold, adjusting the dosing of reductant according to a first process, wherein the first process includes:
adjusting a desired storage of reductant in the catalyst based on the difference between the measured value indicative of NOx conversion and a target value of NOx conversion, wherein the desired storage is a target amount of reductant that is absorbed by the catalyst; and
adjusting the dosing of reductant based on the adjusted desired storage; or
upon determining that the inlet temperature is greater than the first temperature threshold, adjusting the dosing of reductant according to a second process, wherein the second process includes:
adjusting the dosing of reductant based on the difference between the measured value indicative of NOx conversion and the target value of NOx conversion.

19. The method of claim 1, wherein the dosing of reductant is controlled based on one or more maps or lookup tables, wherein the one or more maps or lookup tables include a reductant to NOx ratio as a function of inlet temperature and mass flow rate.

20. The control system of claim 10, wherein the dosing of reductant is controlled based on one or more maps or lookup tables, wherein the one or more maps or lookup tables include a reductant to NOx ratio as a function of inlet temperature and mass flow rate.

* * * * *